United States Patent
Szakacsits

(10) Patent No.: US 8,775,738 B2
(45) Date of Patent: Jul. 8, 2014

(54) READING OR WRITING TO MEMORY

(75) Inventor: Szabolcs Szakacsits, Helsinki (FI)

(73) Assignee: Tuxera Inc, Helsinki (FI)

(*) Notice: Subject to any disclaimer, the term of this patent is extended or adjusted under 35 U.S.C. 154(b) by 424 days.

(21) Appl. No.: 13/168,871

(22) Filed: Jun. 24, 2011

(65) Prior Publication Data

US 2011/0320718 A1    Dec. 29, 2011

(30) Foreign Application Priority Data

Jun. 29, 2010 (FI) .................. 20105743

(51) Int. Cl.
*G06F 12/00* (2006.01)
*G06F 12/08* (2006.01)

(52) U.S. Cl.
CPC .... *G06F 12/0888* (2013.01); *G06F 2212/1041* (2013.01); *G06F 2212/1024* (2013.01); *G06F 12/0866* (2013.01)
USPC ............ 711/118; 711/138; 711/E12.001; 711/E12.017

(58) Field of Classification Search
USPC ............ 711/118, 138, E12.001, E12.017
See application file for complete search history.

(56) References Cited

U.S. PATENT DOCUMENTS

| | | | |
|---|---|---|---|
| 6,266,742 B1 | 7/2001 | Challenger et al. |
| 2007/0266217 A1 | 11/2007 | Moyer et al. |
| 2008/0184003 A1 | 7/2008 | Ono |
| 2010/0115205 A1 | 5/2010 | Brown et al. |
| 2010/0332717 A1 | 12/2010 | Maeda et al. |

FOREIGN PATENT DOCUMENTS

| | | |
|---|---|---|
| WO | 2008/004149 | 10/2008 |
| WO | 2009/107393 | 9/2009 |

OTHER PUBLICATIONS

Chi, Chi-Hung et al., "Improving Cache Performace by Selective Cache Bypass," IEEE Jan. 1989, pp. 277-285.
English Abstract of WO 2009/107393 A1, 2 pages.
Tuxera Inc., Patent Cooperation Treaty International Search Report, European Patent Office; International Application No. PCT/FI2011/050597 filed on Jun. 21, 2011, mailed on Dec. 14, 2011; 8 pages.

*Primary Examiner* — Jasmine Song
(74) *Attorney, Agent, or Firm* — Dentons US LLP

(57) ABSTRACT

To increase the efficiency of a running application, it is determined whether using a cache or directly a storage is more efficient block size-specifically; and the determined memory type is used for a data stream having a corresponding block size.

22 Claims, 2 Drawing Sheets

READING OR WRITING TO MEMORY

CROSS-REFERENCE TO RELATED APPLICATIONS

The present patent application claims priority from Finland Patent Application No. 20105743, filed on Jun. 29, 2010.

FIELD

The invention relates to storing or retrieving of data and, particularly, to reading and/or writing a data stream for an application.

BACKGROUND

The speed of an application running on a computer, executed by one or more processors, is primarily determined by access speed to information that is to be processed and by the speed with which processed information can be stored until needed either for further processing or for inputting.

Different memory types with different properties, especially different speeds, thereby having different prices, are used in computer systems. Further, different buses used between the memory and a processor running the application, and components connected to the bus affect to the reading and/or writing speed. Further, the characteristics of memories are evolving and a memory used in the computer or by the computer may be updated to a faster one. A basic division between memories is that memory is either a cache which is a buffer memory used as a high speed storage for frequently accessed instructions and data, or the memory is a so called main memory or storage. Basically there are two types of memory I/O (i.e. writing/reading) operations: accessing directly the storage or using the cache through which all data streams pass to and/or from the main memory. Currently using the cache is a default solution. However, sometimes accessing directly the storage may be more efficient and have less overhead.

WO 2008/004149 discloses a solution in which part of a flash memory, which is used as a storage, is allocated to be used as a buffer for the rest of the flash memory in order to minimize a time overhead and wear-out of flash memories. In the solution, all write and read requests pass a memory controller. When the memory controller receives a data stream to be written to the memory, it compares the size of the received data stream to a predetermined number of data packets, and if the data stream is bigger than the predetermined number of data packets, it is directly stored to its target destination, otherwise it is stored for the buffer portion to be stored later to the target destination and to be read from the buffer portion as long as it is there. When data from the buffer portion is stored and there is more than one piece of data having the same target destination, only the newest one is stored.

The solution in WO 2008/004149 still happens within the storage, and the data stream to and from the memory controller passes via a cache, although accessing directly the flash memory might be more efficient.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Aspects of some embodiments include deciding, based on information on a block size of a data stream and determined cache and storage performance for the block size, whether to use a cache or directly a storage, and to act accordingly.

Various aspects of the invention comprise a method, an apparatus, and a computer program product as defined in the independent claims. Further embodiments of the invention are disclosed in the dependent claims.

BRIEF DESCRIPTION OF THE DRAWINGS

In the following different embodiments will be described in greater detail with reference to the attached drawings, in which.

DETAILED DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of the present invention are applicable to computing apparatuses, computers, corresponding components, and/or to any computing system or network supporting use of cache. A computing apparatus may comprise any kind of processors, operating systems and memory/memories. Therefore, all words and expressions should be interpreted broadly and are intended to illustrate, not to restrict, the embodiment.

Figure 1:
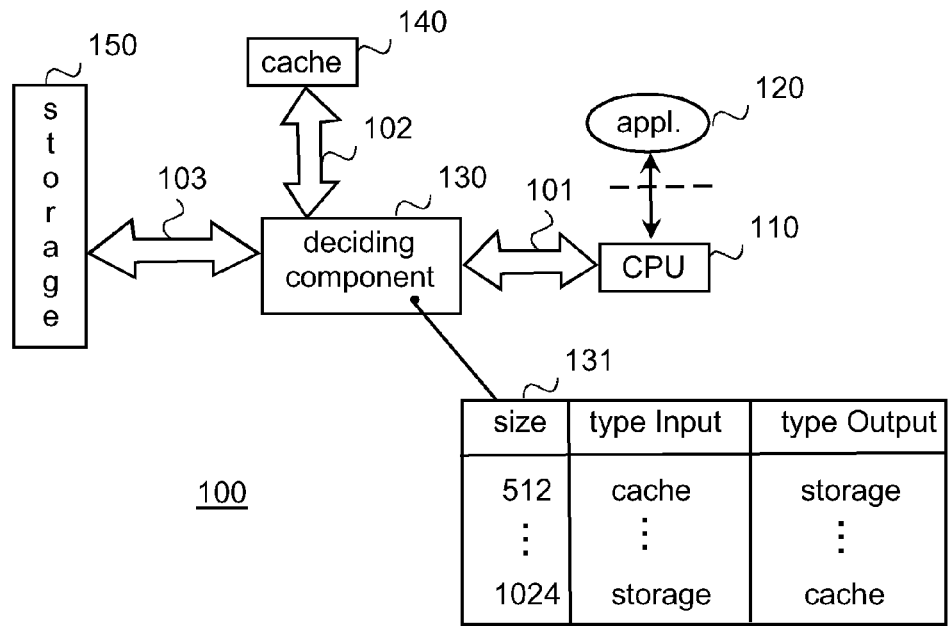
FIG. 1 is a simplified block diagram according to an embodiment.

A general arrangement of a computing apparatus according to an embodiment is illustrated in FIG. 1. FIG. 1 is a simplified block diagram only showing some components of the computing apparatus, the components being used to illustrate an embodiment. It should be appreciated that the computing apparatus may comprise other components, modules, connections, couplings, etc. which need not to be described in detail here.

The computing apparatus 100, depicting a computing environment, comprises a processor 110 running an application 120 and coupled via a bus 101 to a deciding component 130. The deciding component 130, and thereby the processor and the application, is further coupled to a cache 140 via a bus 102 and to a storage 150 via a bus 103. The computing apparatus 100, implementing the functionality of the deciding component 130 described below with an embodiment, comprise not only prior art means, but also means for deciding whether to use cache or directly the storage, for example. More precisely, the computing apparatus comprise means for implementing functionality described with an embodiment and it may comprise separate means for each separate function, or means may be configured to perform two or more functions, and even to combine functions of different embodiments.

Generally the processor 110 is a central processing unit (CPU), but the processor may be an additional operation processor. It should be appreciated that the computing apparatus may comprise other components and/or the cache and the storage may locate in another computing apparatus accessible via an interface.

The deciding component 130 is configured to perform functionalities described below with an embodiment, and it may be configured to perform functionalities from different embodiments. For this purpose, the deciding component may comprise small amount of memory for storing a decision table 131 and, depending on an implementation is connected to the processor 110 or comprises itself a processor (not shown in FIG. 1) for performing the functionalities. Further, the deciding component may comprise other units, and it comprises different interfaces for receiving and forwarding control information, data and write or read requests, for example.

The deciding component according to an embodiment may generally be a controller, control unit, micro-controller, or the like connected to the internal memory and to various interfaces of the apparatus. The deciding component may be configured as a microprocessor, such as a single-chip computer element, or as a chipset, or a board including at least a memory for providing storage area used for arithmetic operation and an operation processor for executing the arithmetic operation. The deciding component may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. An embodiment provides the deciding component as a computer program embodied on any computing apparatus distribution/data storage medium, comprising program instructions which, when loaded into an apparatus, constitute the deciding unit. Programs, also called program products, including software routines, program snippets constituting "program libraries", applets and macros, can be stored in any medium, and may be downloaded into a computing apparatus.

The cache 140 and the storage 150 may be a volatile and/or non-volatile memory, and they may be of different type. For example, the cache and/or the storage may store computer program code such as software applications or operating systems, information, data, content, or the like for the central processing unit, or a corresponding processor, to perform steps associated with operation of the application. The cache and/or storage may be, for example, random access memory, a hard disk, a flash memory, a solid state memory (SSD), or other fixed data memory or storage device. Further, the cache and/or storage, or part of it (them), may be removable memory detachably connected to the apparatus.

The bus 102 and the bus 103 may be any type of a bus transferring any kind of data between the components, and they may be of different type. A bus may be a parallel bus, which carry data in parallel on multiple wires, or a serial bus, which carry data in bit-serial form, or a bus using both parallel and bit-serial connections. Thus, the bus 102 and the bus 103 may be any physical arrangement, containing different connections and components that provide transfer of data.

Although the computing apparatus has been depicted in FIG. 1 as one entity, the memories may be implemented in one or more physical or logical entities. For example, the cache and/or the storage may be implemented as distributed (shared) storage devices across multiple computing apparatuses and the buses may transfer data inside the computing apparatus or between computing apparatuses. The units and functions may be software and/or software-hardware and/or firmware components (recorded indelibly on a medium such as read-only-memory or embodied in hard-wired computer circuitry).

Figure 2:
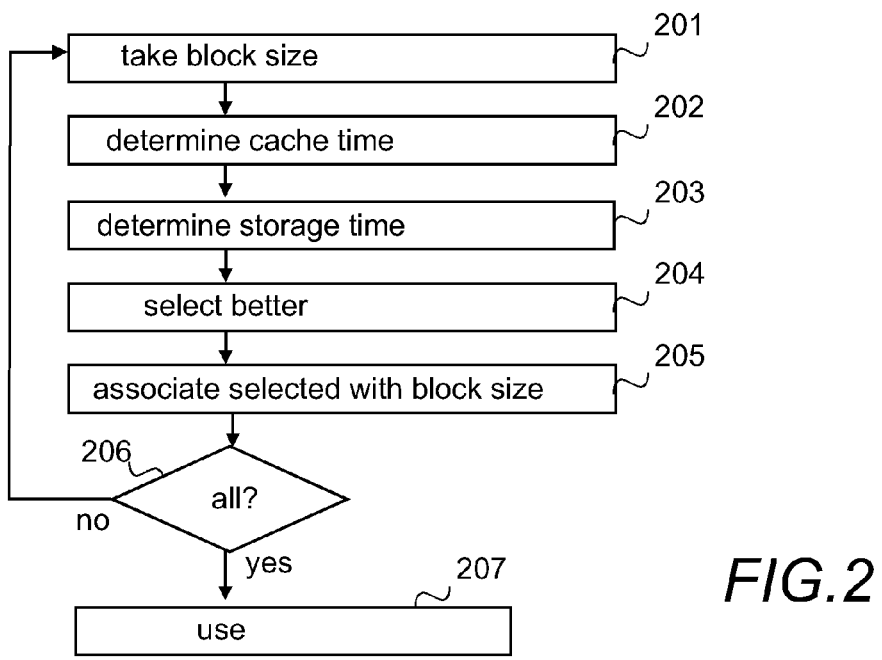
FIGS. 2 to 4 are flow charts illustrating embodiments.

FIG. 2 illustrates functionality of a deciding component according to an embodiment. In the embodiment, the deciding component determines by measuring for certain block sizes whether it is more efficient to use the cache or store directly to the storage, i.e. which one of the memory types is the more efficient one. The block sizes can be 512, 1, 2, 4, . . . 1024 kB, for example. (A block is a unit of writing and/or reading).

In the embodiment, the deciding component performs the below described steps separately for reading (inputting) and writing (outputting). It should be appreciated that they may be performed almost simultaneously and/or in another order than the one described below. In another embodiment, the deciding component performs the below described steps only to reading or to writing, and then uses the outcome for both reading and writing. However, since reading and writing are separate tasks, performing the steps for both to reading and to writing has the advantage that the overall performance of I/O is the most efficient available in the computing apparatus.

In the illustrated example it is assumed, for the sake of clarity, that a time to read (or write) is used as a decisive factor to decide which one is the more efficient. However, there are no restrictions to what is used as the decisive factor and it may be a combination of different factors. For example, the decisive factor may relate to the use of processor resources, such as CPU resources (a more efficient way uses less CPU resources for the same amount of work or the same amount of CPU resources performs more work), or the decisive factor may take into account both the time and the usage of processor resources. Further, the applications using the read and/or write operation of the computing apparatus, may have requirements affecting to the decisive factor. In an embodiment, a user may be given an opportunity to select the decisive factor by providing the user with a selection list, for example, and then the user's selection is used.

The deciding component takes a first block size (step 201), reads, in step, 202, the amount from cache at the same time measuring the time it takes. Then the same amount is read, in step 203, directly from the storage and the time it takes is measured. Next the deciding unit selects, in step 204, the memory type which was more efficient, i.e. in the illustrated example the fastest one, and associates, in step 205 the memory type with the block size for reading. Then it is checked, in step 206, whether all block sizes are associated with a memory type. If not, the deciding component performs the above for a next block, i.e. continues in step 201. If all block sizes are associated with a memory type, they are ready for use (step 207) for reading (inputting).

In the embodiment the above steps are then repeated to writing. In other words, instead of reading, writing is performed in steps 202 and 203. The outcome may then be a decision table having block size-specific memory type selections separately for reading and for writing, the memory type for reading being either the same as for writing, or different, like illustrated in FIG. 1.

An advantage of the embodiment is that all components, different buses, etc. are taken into account according to their real life functionality, when determining the memory type to use. This has a further advantage that the load of processors is minimized, and thereby less heat is generated, and less energy is needed.

In a further embodiment of the invention, instead of performing measurements, such as measuring the time, the deciding component obtains system parameters, such as sizes of memories (i.e. the cache and the storage), how much there is free memory at the moment, bus speeds, and uses the information to calculate for each block size the more efficient memory type (storing via cache or storing directly).

In a further embodiment, the deciding component is configured to both measure and calculate, and compare the measurement results to the calculated results to validate the hardware. An advantage provided by the validation of the hardware is that it assists to detect a possible fault, thereby facilitating fault correction before any bigger faults takes place.

The above illustrated measurements/calculations may be performed when power is turned on, at certain intervals, and/or when there are hardware or software changes in the computing apparatus, such as operating system online update, driver update, cache management software update, a new memory board being installed, etc.

In another embodiment, the measurements/calculations are performed each time a data stream starts, to the block size used by the data stream.

Figure 3:
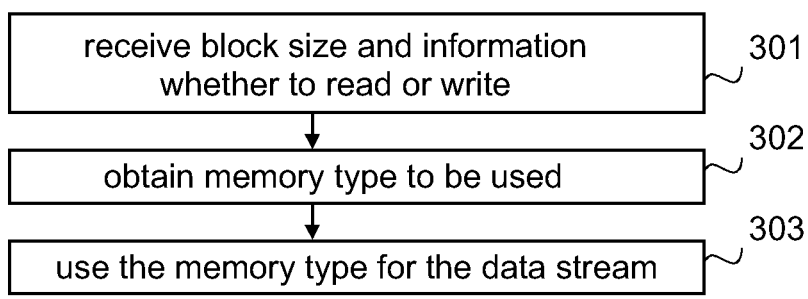

FIG. 3 illustrates a situation in which the deciding component receives, in step 301, an indication of a block size of a data stream and information on whether a data stream is to be read or written. Then the deciding component, using the received indication, obtains, in step 302, a value from a table created, for example, as illustrated above with FIG. 2, the value being either "cache" or "storage". If the received block size is not one of the tested block sizes, i.e. it does not have a memory type associated with it, depending on the implementation it is either rounded up or down to the next block size, or the closest block size is used. Then the obtained memory type is used, in step 303, for the data stream. For example, if the data stream is to be written, then the data stream is forwarded from the deciding component either to the cache or to the storage, depending on which one was obtained in step 302.

The above applies also to implementations, in which the indication of a block size of a data stream and information on whether a data stream is to be read or written passes through the deciding component but the actual data stream does not pass the deciding component.

Figure 4:
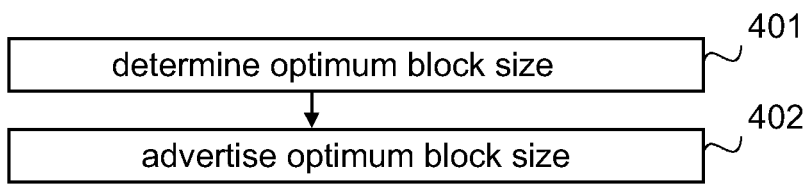

The deciding component may be transparent to applications. However, FIG. 4 illustrates an embodiment in which, after the block sizes are associated with corresponding memory types for reading/writing, the deciding component determines, in step 401, the optimum block size and advertises, in step 402, the optimum block size to the applications. The optimum block size is preferably determined by using the measurement and/or calculation results obtained during the procedure described with FIG. 2, and the optimum is the one giving the best overall result (best speed or best performance, for example). Thus, the embodiment provides a dynamic, optimal value to be advertised, the value being obtained by measurements and/or calculations that take into account the computing environment and changes made to it. Advertising such a value improves the efficiency which is rarely the case with a prior art hardcoded advertised value which is based on an estimate made by a developer, i.e. is the developer's best guess at the time it is hardcoded.

The steps and related functions described above in FIGS. 2 to 4 are in no absolute chronological order, and some of the steps may be performed simultaneously or in an order differing from the given one. For example, read and write measurements may be performed (steps 202-205) for one block size before another block size is taken (steps 201 and 206). Other functions can also be executed between the steps or within the steps. Some of the steps or part of the steps can also be left out. For example, an application reading and/or writing data may request its own control for reading and/or writing, in which case, although the data stream may pass via the deciding component, the deciding component, in response to the request, does not obtain the memory type to be used, i.e. steps 302 and 303 are then skipped. Further, some of the steps or part of the steps can also be integrated together or replaced by a corresponding step or part of the step. For example, instead of or in addition to measuring the time in steps 202 and 203, CPU usage may be measured.

It will be obvious to a person skilled in the art that, as the technology advances, the inventive concept can be implemented in various ways. The invention and its embodiments are not limited to the examples described above but may vary within the scope of the claims.

What is claimed is:

1. A method for a computing environment, the method comprising:
    measuring, for a block size, one or more factors of a group including a time duration for reading a block having the block size from a cache, a time duration for writing the block to the cache, a time duration for both reading the block from the cache and writing to the block to the cache, an amount of use of processor resources for reading the block from the cache, an amount of use of processor resources for writing the block to the cache, and an amount of use of processor resources for both reading the block from the cache and writing the block to the cache;
    repeating the measuring using directly a storage instead of the cache;
    determining for the block size whether using the cache or directly the storage is more efficient on the basis of results obtained from the measuring; and
    using, in response to a data stream having the block size, the determined more efficient way for the block size.

2. A method of claim 1, wherein the measuring is performed for certain block sizes, and the determining further comprising:
    selecting for each measured block size the more efficient way; and associating the block size with the selected way.

3. A method of claim 1, wherein the determining comprises:
    obtaining system parameters of the computing environment, the obtained system parameters affecting to the efficiency of memory usage;
    calculating, by using the obtained system parameters, for certain block sizes whether using a cache or directly a storage is more efficient;
    selecting for each calculated block size the more efficient way;
    associating the block size with the selected way; and
    using, in response to a data stream having the block size, the determined more efficient way for the block size.

4. A method of claim 2, further comprising:
    obtaining system parameters of the computing environment, the obtained system parameters affecting to the efficiency of memory usage;
    calculating, by using the obtained system parameters, for the certain block sizes efficiency of using a cache and using directly a storage;

comparing corresponding measurement results to calculation results to validate a hardware in the computing environment.

5. A method of claim 2, further comprising:
receiving information on a block size of a data stream;
determining which measured block size the block size of the data stream corresponds to; and
using the associated way for the data stream.

6. A method of claim 2, further comprising:
determining, based on the measurement results by which the selection was performed, an optimum block size; and
advertising the optimum block size to applications.

7. A method of claim 3, further comprising:
determining, based on the calculation results by which the selection was performed, an optimum block size; and
advertising the optimum block size to applications.

8. A method of claim 3, further comprising performing the step of calculating for reading and for writing separately.

9. A method of claim 3, further comprising performing the calculating for efficiency of using a cache and using directly a storage for at least one decisive factor from a group of decisive factors, the group including a time duration to take to read the block, a time duration to take to write the block, a time duration to take to read the block and write the block, an amount of use of processor resources for reading the block, an amount of use of processor resources for writing the block, and an amount of use of processor resources for reading and writing the block.

10. A method of claim 1, wherein the determined more efficient way for the block size is used regardless of the data type of the data stream.

11. A method of claim 3, wherein the determined more efficient way for the block size is used regardless of the data type of the data stream.

12. A computer program product comprising a non-transitory computer-readable storage medium having computer-readable instructions stored therein, the computer-readable instructions being executable by a computer and comprising at least a first set of instructions for determining for a block size whether using a cache or directly a storage is more efficient, the first set of instructions comprising one of the sets comprising a measurement instructions set and a calculation instruction set, wherein the measurement instruction set comprises instructions to measure both for using the cache and for using directly the storage one or more of the following factors in a group comprising a time it takes to read a block having the block size, a time it takes to write the block, a time it takes to read and write the block, an amount of use of processor resources for reading the block, an amount of use of processor resources for writing the block, and an amount of use of processor resources for reading and writing the block; and instructions to determine on the basis of results obtained by measuring; and the calculation instruction set comprises instructions to obtain system parameters of the computing environment, the obtained system parameters affecting to the efficiency of memory usage, to calculate, by using the obtained system parameters, for the block size whether using the cache or directly the storage is more efficient and instructions to determine on the basis of results obtained by calculating.

13. A computer program product of claim 12, wherein the computer-readable instructions further comprise a second set of instructions for using, in response to a data stream having the block size, the determined more efficient way for the block size.

14. A computer program product of claim 12, wherein the first set of instructions include instructions for performing the one of the sets comprising the measurement instructions set and the calculation instruction set for certain block sizes for selecting for each measured block size the more efficient way and for associating the block size with the selected way.

15. A computer program product of claim 14, wherein the computer-readable instructions of the measurement set further comprise a third set of instructions for obtaining system parameters of the computer, the obtained system parameters affecting to the efficiency of memory usage; for calculating, by using the obtained system parameters, for certain block sizes efficiency of using a cache and using directly a storage; for comparing corresponding measurement results to calculation results; and for validating a hardware in the computer by means of the outcome of the comparing.

16. A computing apparatus configured to use a cache and directly a storage, the computing apparatus comprising:
at least one processor; and
at least one memory including computer program code;
the at least one memory and the computer program code configured to, with the at least one processor, cause the computing apparatus at least to determine, for a block size, efficiency of using the cache and efficiency of using directly the storage, by performing one of sets comprising measurement instructions set and calculation instruction set;
determine whether using the cache or directly the storage is more efficient for the block size on the basis of results obtained by performing one of the sets; and
use, in response to a data stream having the block size, the determined more efficient way for the block size;
wherein
the measurement instruction set comprises instructions to measure both for using the cache and for using directly the storage one or more of the following factors in a group comprising a time it takes to read a block having the block size, a time it takes to write the block, a time it takes to read and write the block, an amount of use of processor resources for reading the block, an amount of use of processor resources for writing the block, and an amount of use of processor resources for reading and writing the block; and instructions to determine on the basis of results obtained by measuring; and
the calculation instruction set comprises instructions to obtain system parameters of the computing environment, the obtained system parameters affecting to the efficiency of memory usage, to calculate, by using the obtained system parameters, for the block size whether using the cache or directly the storage is more efficient.

17. A computing apparatus of claim 16, wherein the at least one memory and the computer program code configured to, with the at least one processor, further cause the computing apparatus to determine the efficiency for certain block sizes by measuring the efficiency; select for each measured block size the more efficient way; and associate the block size with the selected way.

18. A computing apparatus of claim 16, wherein the at least one memory and the computer program code configured to, with the at
least one processor, further cause the computing apparatus to:
determine, in response to receiving information on a block size of a data stream, which one of block sizes for which the more efficient way is determined corresponds to the block size of the data stream; and
use for the data stream the way determined for the one of the block sizes.

19. A computing apparatus of claim 16, wherein the at least one memory and the computer program code configured to, with the at least one processor, further cause the computing apparatus to:
    determine an optimum block size by means of the determined efficiency; and
    advertise the optimum block size to applications in the computing apparatus.

20. A computer hardware component configured to:
    measure for certain block sizes whether using a cache or directly a storage is more efficient by measuring one or more of the following factors in a group comprising a time it takes to read a block having the block size, a time it takes to write the block, a time it takes to read and write the block, an amount of use of processor resources for reading the block, an amount of use of processor resources for writing the block, and an amount of use of processor resources for reading and writing the block;
    select for each measured block size the more efficient way;
    associate the block size with the selected way; and
    use, in response to a data stream having the block size, the determined more efficient way for the block size.

21. A computer hardware component of claim 20, the computer component being further configured to measure, select, associate and use for reading and for writing separately.

22. A computer hardware component as claimed in claim 20, the computer component being one of a group comprising a controller, control unit, micro-controller, a single-chip computer element, a chipset and a board.

* * * * *